United States Patent
Oohara et al.

(10) Patent No.: US 7,612,944 B2
(45) Date of Patent: Nov. 3, 2009

(54) OPTICAL DEVICE

(75) Inventors: Junji Oohara, Nisshin (JP); Yukihiro Takeuchi, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 11/979,362

(22) Filed: Nov. 1, 2007

(65) Prior Publication Data

US 2008/0130139 A1    Jun. 5, 2008

(30) Foreign Application Priority Data

Nov. 6, 2006   (JP)   .............................. 2006-300759

(51) Int. Cl.
*G02B 27/10* (2006.01)
*G02B 6/32* (2006.01)

(52) U.S. Cl. ........................................ 359/620; 385/33

(58) Field of Classification Search ................. 359/619, 359/620; 385/33, 34, 39, 120, 129; 65/406, 65/408, 409; 257/98, E21.023; 264/1.32, 264/1.34, 1.36, 2.6; 438/696; 216/2, 79
See application file for complete search history.

(56) References Cited

U.S. PATENT DOCUMENTS

| 6,277,756 | B1 | 8/2001 | Ohara et al. |
|---|---|---|---|
| 6,630,389 | B2 | 10/2003 | Shibata et al. |
| 7,129,176 | B2 | 10/2006 | Oohara et al. |
| 7,532,404 | B2 * | 5/2009 | Oohara et al. ............... 359/620 |
| 2007/0019406 | A1 | 1/2007 | Oohara et al. |

* cited by examiner

*Primary Examiner*—Jack Dinh
(74) *Attorney, Agent, or Firm*—Posz Law Group, PLC

(57) ABSTRACT

An optical device includes a silicon substrate, and multiple columnar members. The columnar members are integrally formed with the silicon substrate and stand on a top surface of the silicon substrate. The columnar members are made of silicon oxide. Light enters the columnar members in a first direction and propagates through the columnar members in a second direction. The columnar members extend in a third direction. The columnar members are arranged with a gap in the second direction. The second direction is perpendicular to the third direction. An angle between the first and third directions is greater than a critical angle and equal to or less than 90 degrees.

19 Claims, 9 Drawing Sheets

US 7,612,944 B2

OPTICAL DEVICE

CROSS CHECK TO RELATED APPLICATION

This application is based on and incorporates herein by reference Japanese Patent Application No. 2006-300759 filed on Nov. 6, 2006.

FIELD OF THE INVENTION

The present invention relates to an optical device.

BACKGROUND OF THE INVENTION

For example, U.S. Pat. No. 7,129,176 corresponding to JP-A-2004-271756 has disclosed a technique for forming optical devices such as a microlens, a prism, and an optical waveguide on a silicon substrate. According to the technique disclosed in U.S. Pat. No. 7,129,176, first, a silicon substrate is etched by using a mask to form a number of trenches. As a result, multiple columnar members are separately arranged by the trenches. Each columnar member extends in parallel with a light axis so that transmittance of light can be improved. Then, the columnar members are thermally oxidized and changes to silicon oxide. As a result, the columnar members thermally expand, and the trenches are buried accordingly. Thus, a predetermined region of the silicon substrate becomes a block member. The block member exhibits an optical function depending on an outer shape thereof and acts as an optical device.

If an unoxidized portion (i.e., silicon) remains in the columnar members, the light transmittance of the block member is reduced, because the silicon is opaque to light. Therefore, it is important that the trenches exist between the columnar members to supply oxygen to the columnar members until the columnar members are completely oxidized. It has been empirically known that a thermal oxidation layer grows outside and inside with respect to a surface of the silicon substrate by a ratio of 0.55:0.45, respectively.

The unoxidized portion remaining in the columnar members after the thermal oxidation can be prevented by increasing width of the trenches. In this case, however, the trenches cannot perfectly buried after the columnar members expand due to the thermal oxidation. As a result, gaps derived from the trenches remain between the columnar members after the thermal oxidation. Since the gaps are regularly arranged, the gaps serves as a diffractive grating. Therefore, the light passing through the block member is divided into order diffraction lights traveling in different directions. The optical device uses only one of the order diffraction lights. For example, when the optical element acting as a lens, a zero-order diffraction light is used. As a result, the light transmission of the optical device is substantially reduced.

SUMMARY OF THE INVENTION

In view of the above-described problem, it is an object of the present invention to provide an optical device having a high transmittance of light regardless of gaps.

An optical device includes a silicon substrate, and multiple columnar members. The columnar members are integrally formed with the silicon substrate and stand on a top surface of the silicon substrate. The columnar members are made of silicon oxide. Light enters the columnar members in a first direction and propagates through the columnar members in a second direction. The columnar members extend in a third direction. An angle between the first and third directions is greater than a critical angle and equal to or less than 90 degrees. The columnar members are arranged with a gap in the second direction. The second direction is perpendicular to the third direction.

The gap remaining in the columnar members indicates that the columnar members have been completely oxidized. Therefore, all the columnar members are made of silicon oxide so that high transmittance of light can be obtained. The columnar members are arranged to prevent diffraction effect resulting from the gap. Therefore, the high transmittance of light can be ensured regardless of the gap.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
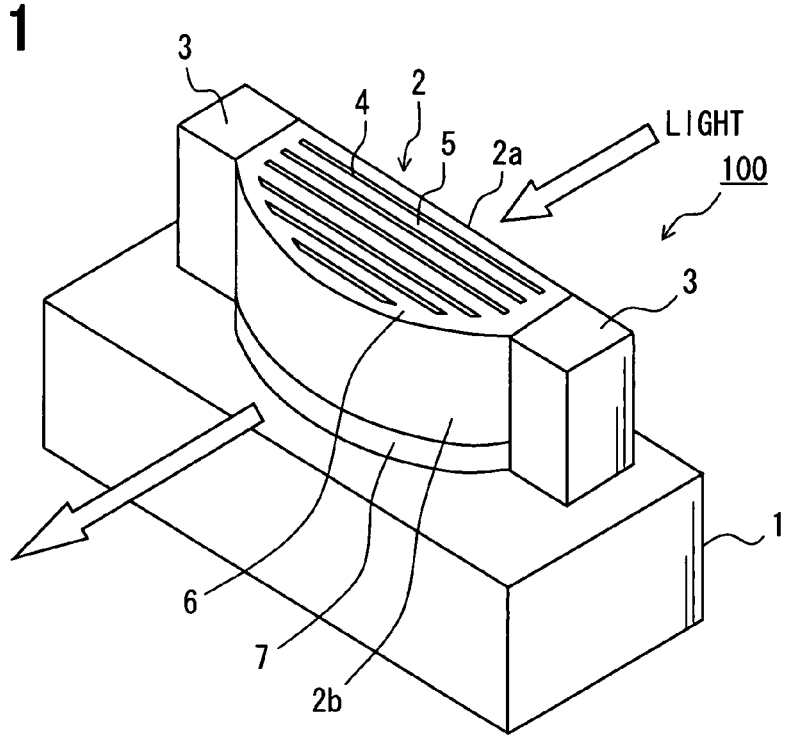
FIG. 1 is a perspective view of an optical device according to a first embodiment of the present invention.

Referring to FIGS. 1-4, an optical device 100 according to a first embodiment of the present invention includes a silicon substrate 1, a microlens 2 disposed on a top surface of the silicon substrate 1, and a second reinforcing member 3 integrally formed with both ends of the microlens 2.

The microlens 2 includes a plurality of columnar members 5 made of silicon oxide. The columnar members 5 are arranged with a gap 4 in an arrangement direction perpendicular to a length direction thereof. Preferably, the microlens 2 further includes a first reinforcing member 6 made of silicon oxide. The first reinforcing member 6 defines an outer shape of the microlens 2.

Figure 2:
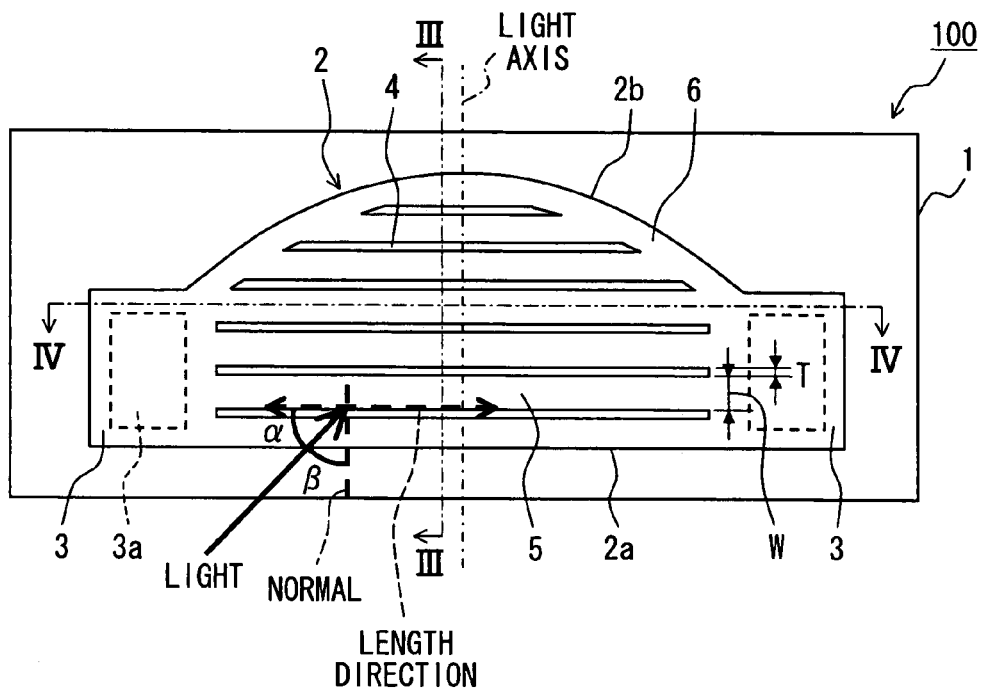
FIG. 2 is a plan view of the optical device of FIG. 1.

In the present embodiment, the second reinforcing member 3, the columnar member 5, and the first reinforcing member 6 are integrally formed with the silicon substrate 1. Each end of the columnar members 5 is joined together at the length direction side by the first and second reinforcing member 6, 3. As shown in FIG. 2, the second reinforcing member 3 includes an unoxidized portion 3a and an oxidized portion inside the unoxidized portion 3a in the length direction. The microlens 2 is constructed with oxidized portions of the columnar members 5, the first reinforcing member 6, and the second reinforcing member 3. In the present embodiment, the microlens 2 is a flat type cylindrical convex lens (i.e., cylindrical plano-convex lens). Specifically, the microlens 2 has a flat inlet surface 2a and a convex outlet surface 2b. The first reinforcing member 6 joins the columnar members 5 forming a convex portion of the microlens 2 together to define the convex outlet surface 2b.

Figure 3:
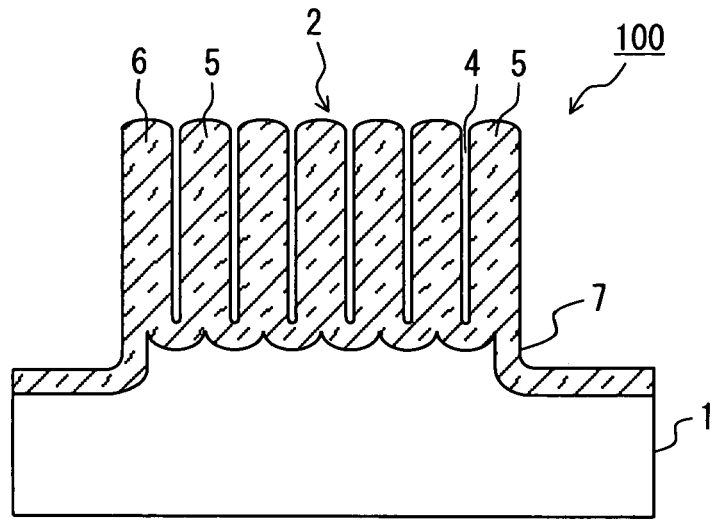
FIG. 3 is a cross-sectional view taken along line III-III of FIG. 2.
Figure 4:
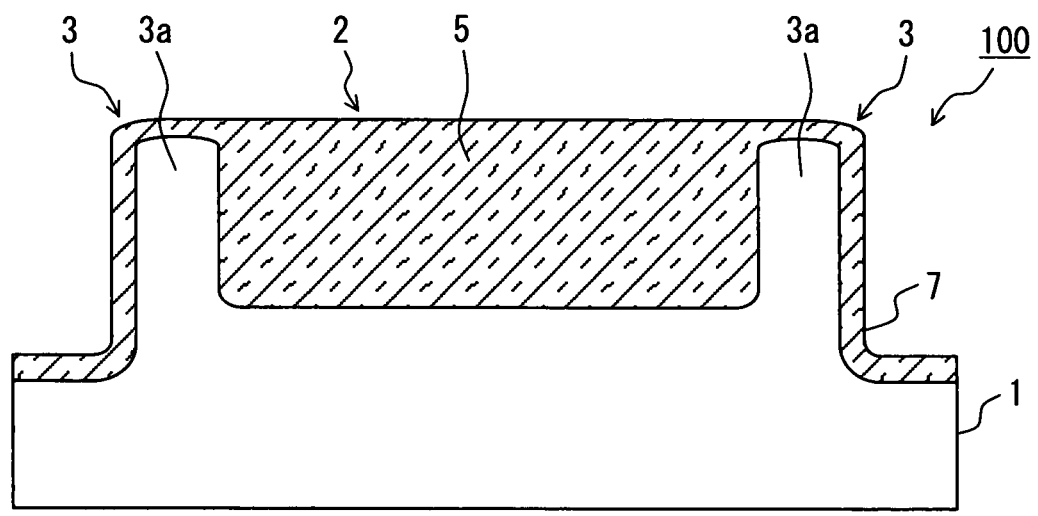
FIG. 4 is a cross-sectional view taken along line IV-IV of FIG. 2.

As shown in FIGS. 3, 4, each columnar member 5 has an arc-shaped bottom surface, where the microlens 2 is joined to the silicon substrate 1 without adhesion bond. A boundary surface between the silicon substrate 1 and the microlens 2 has concave and convex portions alternately arranged in the arrangement direction, and light passes through the microlens 2 in the arrangement direction. Since the microlens 2 is joined to the silicon substrate 1 without the adhesive bond, heat can be efficiently dissipated.

As shown in FIG. 2, an angle $\alpha$ between the length direction of the columnar member 5 and an incident direction of the light is set greater than a critical angle and equal to or less than 90 degrees. In other words, an angle $\beta$ between a normal with respect to the length direction of the columnar member 5 and the incident direction of the light is set equal to or greater than 0 degree and equal to or less than the critical angle.

If the angle $\alpha$ is equal to or less than the critical angle, the light is completely reflected at an interface between the columnar member 5 and the gap 4. As a result, the light cannot propagate through the microlens 2 in the arrangement direction. In the present embodiment, six columnar members 5 are arranged in parallel so that the angle $\alpha$ is equal to or greater than the critical angle. Thus, the light can propagate through the microlens 2 in the arrangement direction. Although the microlens 2 has the multiple gaps 4, diffraction effect does not occur so that high transmittance of the light can be obtained.

Each columnar member 5 has a uniform width W in the arrangement direction, and each gap 4 has a uniform width T in the arrangement direction. In the present embodiment, the columnar member 5 is made of silicon oxide having a refractive index N1 versus a wavelength $\lambda$ of light propagating through the columnar members 5, and the gap 4 is filled with material having a refractive index N2 versus the wavelength $\lambda$. For example, the gap 4 is filled with air having the refractive index N2 of 1. The width W and the width T are set to satisfy the following equations:

$$W = \frac{A}{4 \times N1} \lambda \qquad (1)$$

$$T = \frac{B}{2 \times N2} \lambda \qquad (2)$$

In the equations (1), (2), $\lambda$ represents the wavelength of the light, A represents an odd number, and B represents an integer. When the width W satisfies the equation (1), a reflection light reflected at a front surface of the columnar member 5 is phase-shifted by an odd multiple of $\lambda/2$ from a reflection light reflected at a back surface of the columnar member 5. When the width T satisfies the equation (2), a reflection light reflected at an interface between the gap 4 and one columnar member 5 is phase-shifted by $\lambda/2$ from a reflection light reflected at an interface between the gap 4 and an adjacent columnar member 5. Thus, the gap 4 acts as a non-responsive layer.

Like an non reflective coat (i.e., anti-reflection coat), the reflection lights at the interfaces between the gap and the surfaces of the columnar member 5 cancel each other. The transmittance of the light is improved accordingly. Further, as described above, the diffraction effect does not occur. Therefore, the optical device 100 (i.e., microlens 2) according to the present embodiment can have transmittance of light approximately equal to 100%.

As described above, the first reinforcing member 6 is made of silicon oxide. The first reinforcing member 6 has a columnar shape and stands on the silicon substrate 1. The first reinforcing member 6 joins the columnar members 5 together so that mechanical strength of the microlens 2 can be improved. In the present embodiment, the, each end of the adjacent columnar members 5 is joined together at the length direction side by the first reinforcing member 6. Specifically, the first reinforcing member 6 joins the columnar members 5 forming the convex portion of the microlens 2 together to define the convex outlet surface 2b. The light enters and/or exits the columnar members 5 through the first reinforcing member 6. The microlens 2 can be shaped in various manners by changing the shape of the first reinforcing member 6.

Preferably, the width of the first reinforcing member 6 in the arrangement direction is set equal to or slightly less than the width W of the columnar member 5. In the present embodiment, the width of the first reinforcing member 6 is set slightly less than the width W of the columnar member 5.

The second reinforcing member 3 has a columnar shape and stands on the silicon substrate 1. The second reinforcing member 3 is provided to at least one end portions of the columnar members 5 to join the end portions together. A first width of the second reinforcing member 3 in the arrangement direction of the columnar member 5 is greater than the width W of the columnar member 5. Further, a second width of the second reinforcing member 3 in the length direction of the columnar member 5 is greater than the width W of the columnar member 5.

Although the second reinforcing member 3 is made of silicon oxide, the second reinforcing member 3 has the unoxidized portion 3a. The second reinforcing member 3 joins the columnar members 5 together so that mechanical strength of the microlens 2 can be improved. Since the unoxidized portion 3a is placed outside the end portions of the columnar members 5, the light cannot be obstructed by the unoxidized portion 3a. In the present embodiment, the second reinforcing member 3 is provided to both end portions of the columnar members 5 to join the columnar members 5 together.

The microlens 2 is placed on the silicon substrate 1 through a base member 7. The base member 7 is integrally formed with the silicon substrate 1 and has the same shape as the microlens 2. The microlens 2 and the second reinforcing member 3 are separately formed from each other. In the present embodiment, the height of the microlens 2 is set equal to or greater than 10 micrometers (μm). For example, the height of the microlens 2 is set to about 100 μm. The total length of the microlens 2 and the second reinforcing member 3 is set to about 500 μm.

An example of a method of manufacturing the optical device 100 is described below with reference to FIGS. 2-5.

Figure 5A:
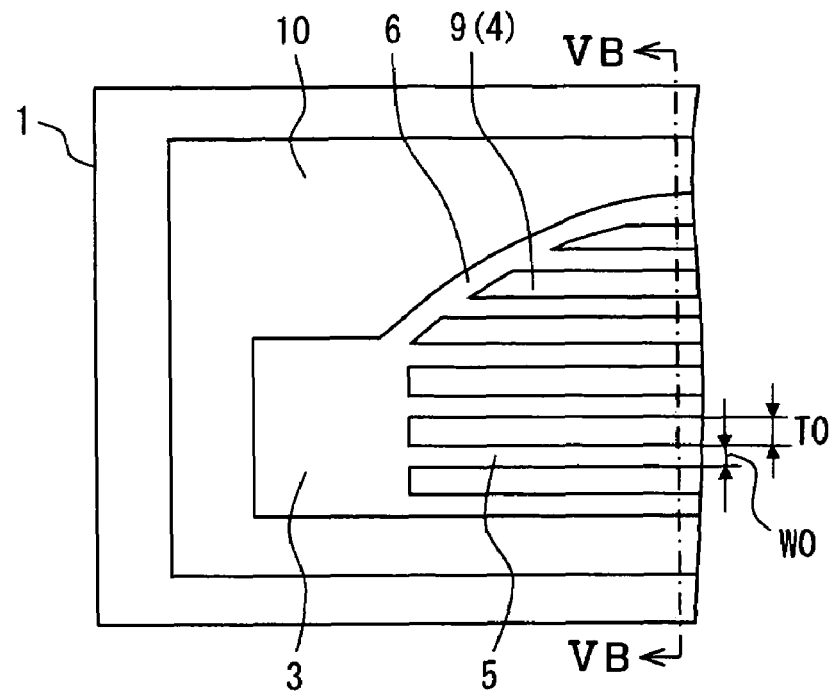
FIG. 5A is a plan view showing a manufacturing process of the optical device of FIG. 1.
Figure 5B:
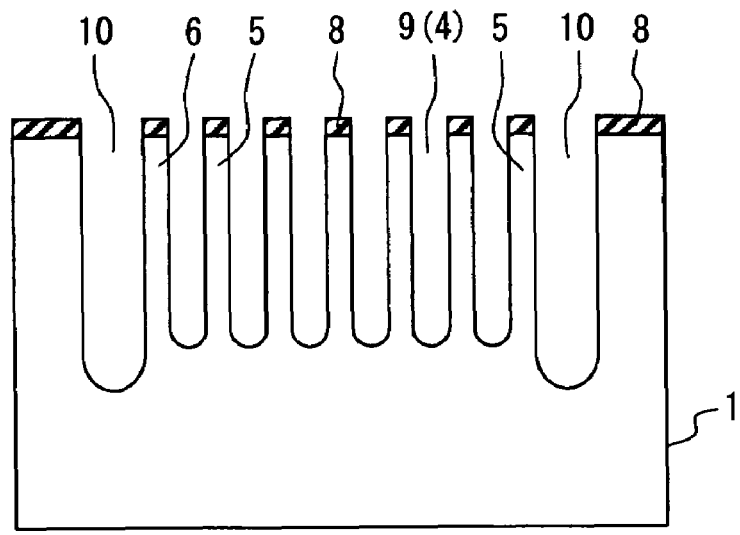
FIG. 5B is a cross-sectional view taken along line VB-VB of FIG. 5A.

First, patterning of the microlens 2 is performed on the silicon substrate 1 by using a mask 8. Then, as shown in FIGS. 5A, 5B, inner and outer trenches 9, 10 are formed by etching the silicon substrate 1 through an opening of the mask 8. The inner trench 9 separates the columnar members 5 from each other and corresponds to the gap 4. The outer trench 10 defines the shapes of the microlens 2 and the second reinforcing member 3.

In the trench etching processes described above, the inner trench 9 is formed such that the angle α between the length direction of the columnar member 5 and the incident direction of the light is set greater than the critical angle and equal to or less than 90 degrees. Further, the width W of the columnar member 5 is set to W0 so that the width W can satisfy the equation (1) after thermal oxidation is finished. Likewise, the width T of the gap 4 is set to T0 so that the width T satisfies the equation (2) after thermal oxidation is finished. For example, when the wavelength λ (in air) of the light is 0.88 μm, and the refractive index N1 of silicon oxide (i.e., the columnar members 5, the first reinforcing member 6, and the oxidized portion of the second reinforcing member 3) versus the wavelength λ is 1.45, the trench etching is performed such that the W0 is 1.98 μm, and the T0 is 2.86 μm.

In the trench etching process, the outer trench 10 is formed such that the columnar members 5 forming the convex portion of the microlens 2 are joined together by the first reinforcing member 6 having a predetermined width. The curvature factor of the inlet surface and the output surface of the light is defined by the shape of the first reinforcing member 6. Therefore, the curvature factor can be adjusted by changing the shape of the first reinforcing member 6.

Oxidation time becomes longer at connection portions between the first reinforcing member 6, and the columnar member 5 and the second reinforcing member 3 than other portions. Therefore, as described above, in the present embodiment, the width of the first reinforcing member 6 is set slightly less than the width W of the columnar member 5. In such an approach, silicon can be uniformly oxidized during thermal oxidation.

Further, the width of the outer trench 10 is much greater than that of the inner trench 9 so that a gap exists in the outer trench 10 after thermal oxidation. In such an approach, buckling due to a difference in coefficient of thermal expansion between silicon oxide and silicon can be avoided. The outer trench 10 is etched deeper than the inner trench 9 because, of microloading effect. Therefore, the microlens 2 is joined to the silicon substrate 1 through the base 7, which has the same shape as the microlens 2 in a direction perpendicular to the top surface of the silicon substrate 1.

To cause the microlens 2 to have a three-dimensional shape, the inner trench 9 needs to have a high aspect ratio (i.e., deep/width). Further, to improve optical characteristics, verticality in cross section profile of the inner trench 9 needs to be ensured. In the present embodiment, the inner trench 9 is formed by etching techniques (i.e., DRIE method) disclosed in U.S. Pat. No. 6,277,756 corresponding to JP-A-2000-299310. Specifically, a protective oxidation film is formed on inner surfaces (i.e., side and bottom surfaces) of the inner trench 9, and then the protective oxidation film on the bottom surface is removed by reactive ion etching (RIE). Then, the silicon substrate 1 is etched through the bottom surface. The protective oxidation film forming process and the bottom surface etching process are alternately repeated. Thus, the inner trench 9 can have the high aspect ratio of about 60, and the cross section profile of the inner trench 9 becomes approximately vertical.

In the present embodiment, the silicon substrate 1 is annealed in the presence of hydrogen. Although the anneal process is optional, the side surfaces of the trenches 9, 10 can be planarized by performing the anneal process. Therefore, the incident and outlet surfaces 2b become smooth after the thermal oxidation. This technique is disclosed in U.S. Pat. No. 6,630,389 corresponding to JP-A-2002-231945.

After the anneal process is finished, the mask 8 is removed, for example, by hydrofluoric acid treatment. Then, the thermal oxidation is performed until all the columnar members 5 and the first reinforcing member 6 change from silicon to silicon oxide. In the present embodiment, since the width of the first reinforcing member 6 is set slightly less than the width W of the columnar member 5, oxidation of the columnar members 5 and the first reinforcing member 6 are completed approximately at the same time.

In the thermal oxidation, oxygen enough to oxidize the columnar members 5 and the first reinforcing member 6 is supplied to the columnar members 5 and the first reinforcing member 6 through the inner and outer trenches 9, 10. As a result, as shown in FIGS. 2-4, the columnar members 6 and the first reinforcing member 6 change to silicon oxide. A portion of the inner trench 9 is filled due to volume expansion of the columnar members 5 and the first reinforcing member 6. As result, the inner trench 9 changes to the gap 4, and the columnar members 5 are separated from each other by the gap 4.

As described above, in the trench etching process, the width W of the columnar member 5 is set to W0, and the width T of the gap 4 is set to T0. Therefore, the widths W, T satisfy the equations (1), (2) respectively after the thermal oxidation is finished. A surface portion of the second reinforcing member 3 changes to silicon oxide during the thermal oxidation, and the unoxidized portion 3a remains inside the second reinforcing member 3.

It has been empirically known that a thermal oxidation layer grows outside and inside with respect to the surface of the silicon substrate 1 by a ratio of 0.55:0.45, respectively. Therefore, after the thermal oxidation, the width W of the columnar member 5 expands from 1.98 μm (W0) to 4.4 μm. Accordingly, the width T of the gap 4 decreases from 2.86 μm (T0) to 0.44 μm. When the wavelength λ in air of the light is 0.88 μm, the wavelength λ in the silicon oxide having the refractive index N1 of 1.45 becomes λ1 of 0.607 μm. Therefore, after the thermal oxidation, the width W of the columnar member 5 is 7.25 times the wave length λ1. In short, in the equation (1), A=29. Likewise, after the thermal oxidation, the width T of the gap 4 is 0.5 times the wave length λ. In short, in the equation (2), B=1.

Then, die cutting is performed along the outer trench 10. Thus, the optical device 100 having the microlens 2 is manufactured.

As described above, according to the present embodiment, the trench etching and thermal oxidation are applied to the silicon substrate 1 so that the gap 4 is formed between the columnar members 5, which are integrally formed with the silicon substrate 1. In such an approach, all the columnar members 5 are fully oxidized so that the high transmittance of the light can be obtained.

The columnar members 5 and the gap 4 are alternately arranged. The angle α between the length direction of the columnar member 5 and the incident direction of the light is set greater than the critical angle and equal to or less than 90 degrees. In such an approach, the light propagates through the columnar members 5 in the arrangement direction. Although the mucrolens 2 has the multiple gaps 4, diffractive effect does not occur. Accordingly, the transmittance of the light can be improved.

The widths W, T of the columnar member 5 and the gap 4 are set so that the reflection lights at the interfaces between the gap and the surfaces of the columnar member 5 cancel each other. In such an approach, the transmittance of the light can be more improved.

Figure 6:
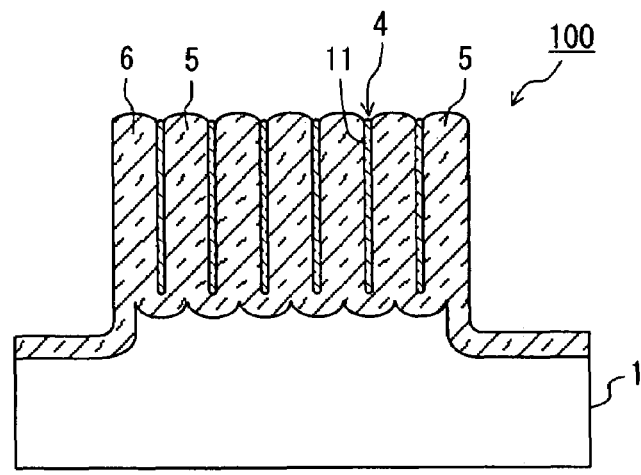
FIG. 6 is a cross-sectional view showing an optical device according to a modification of the first embodiment.

In the present embodiment, the gap 4 is filled with air, which having the refractive index N2 less than the refractive index N1 of silicon oxide, which forms the columnar members 5. By using air, structure of the optical device 100 can be simplified, and manufacturing processes of the optical device 100 can be simplified accordingly. Alternatively, as shown in FIG. 6, the gap 4 may be filled with a material 11 other than air. The material 11 has a refractive index less than that of the silicon oxide and passes light.

Alternatively, the material 11 may have a refractive index N3 greater than the refractive index N1 of silicon oxide. In this case, the widths W, T of the columnar member 5 and the gap 4 are set to satisfy the following equations:

$$W = \frac{C}{2 \times N1} \lambda \quad (3)$$

$$T = \frac{D}{4 \times N3} \lambda \quad (4)$$

In the equations (3), (4), λ represents the wavelength of the light, C represents an integer, and D represents an odd number. Thus, the reflection lights at the interfaces between the gap 4 and the surfaces of the columnar member 5 cancel each other. The mechanical strength of the columnar member 5 can be improved by filling the gap 4 with the material 11 having the refractive index N3 greater than that of air. For example, the material 11 is $Si_3N_4$ (silicon nitride), $SiO_XN_Y$, $Ta_2O_5$, or the like. A refractive index of $SiO_XN_Y$ can be adjusted by changing relative proportions (i.e., values X, Y). The refractive index of silicon oxide can be adjusted by impurity doping.

Figure 7:
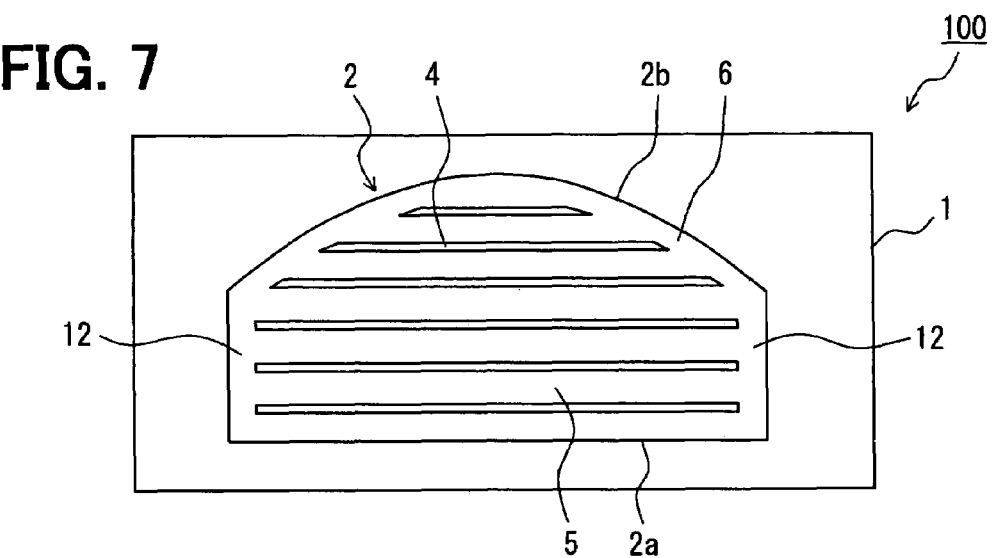
FIG. 7 is a plan view showing an optical device according to another modification of the first embodiment.
Figure 8:
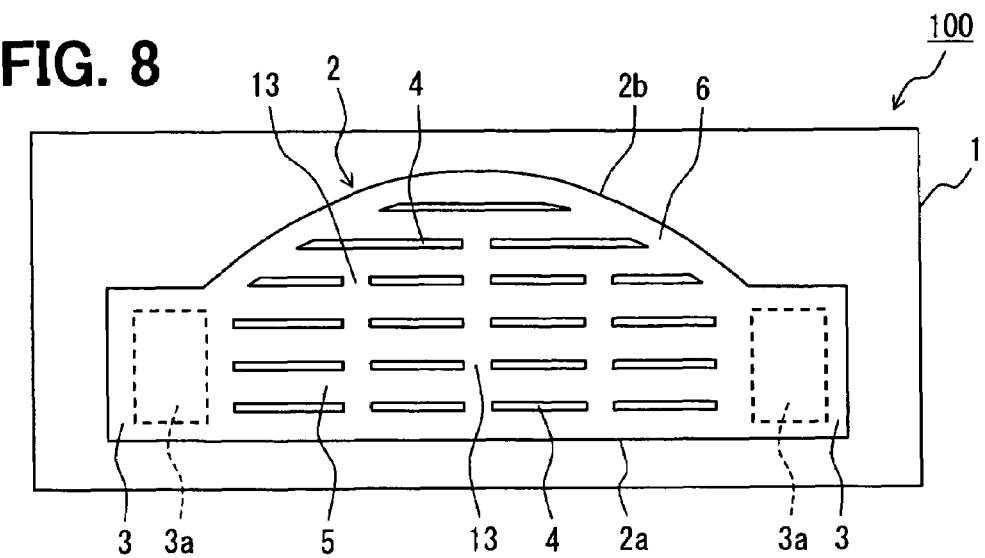
FIG. 8 is a plan view showing an optical device according to another modification of the first embodiment.

In the present embodiment, the columnar members 5 forming the convex portion of the microlens 2 are joined together by the first reinforcing member 6, and other columnar members 5 are joined together by the second reinforcing member 3. Alternatively, as shown in FIG. 7, a first reinforcing member 12 may be used instead of the second reinforcing member 3. In this case, the end portions of the columnar members 5 are surrounded and joined together by the first reinforcing members 6, 12. In such an approach, the mechanical strength of the columnar members 5 can be improved without the second reinforcing member 3. Alternatively, as shown in FIG. middle portions of the columnar members 5 in the length direction may be joined together by a first reinforcing member 13. In such an approach, the mechanical strength of the columnar members 5 can be more improved.

Figure 9A:
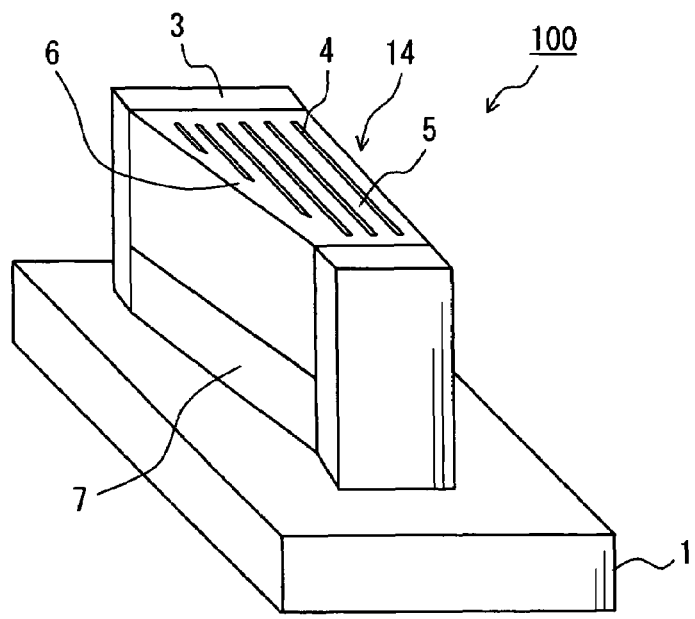
FIG. 9A is a perspective view of an optical device according to another modification of the first embodiment.
Figure 9B:
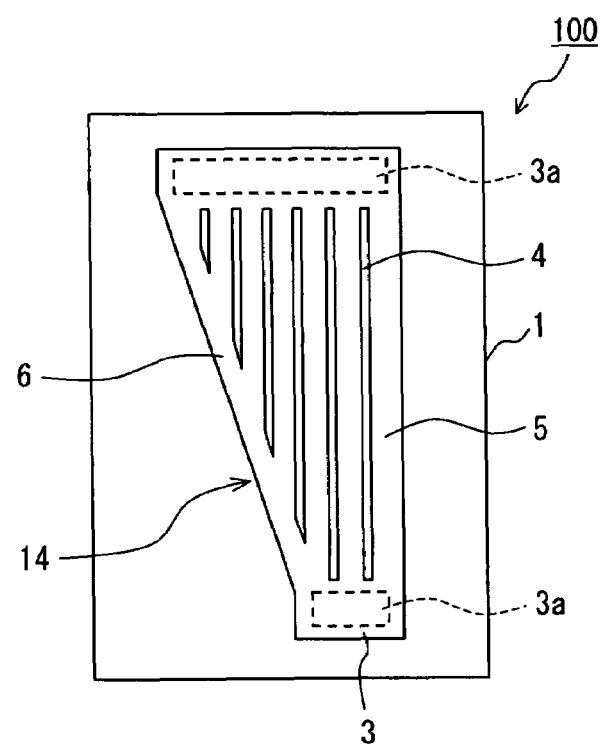
FIG. 9B is a plan view of the optical device of FIG. 9A.
Figure 10A:
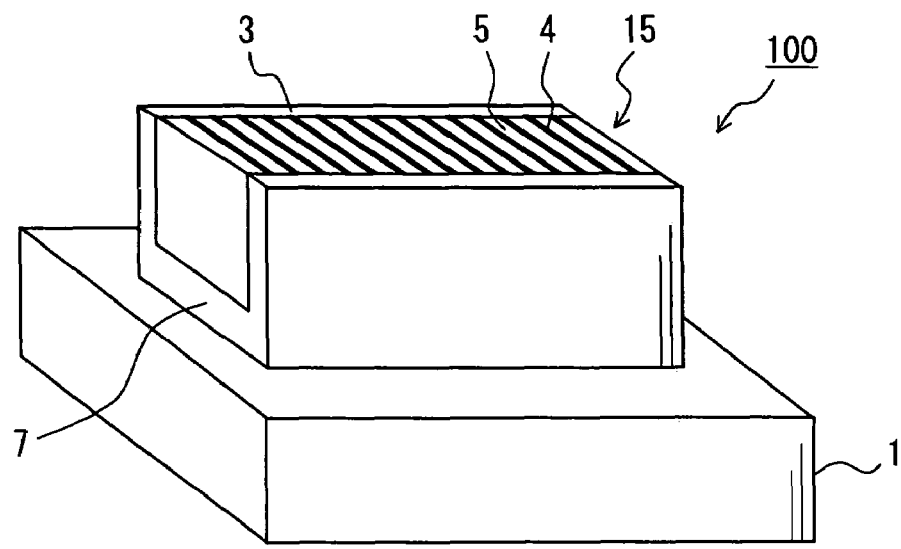
FIG. 10A is a perspective view of an optical device according to another modification of the first embodiment.
Figure 10B:
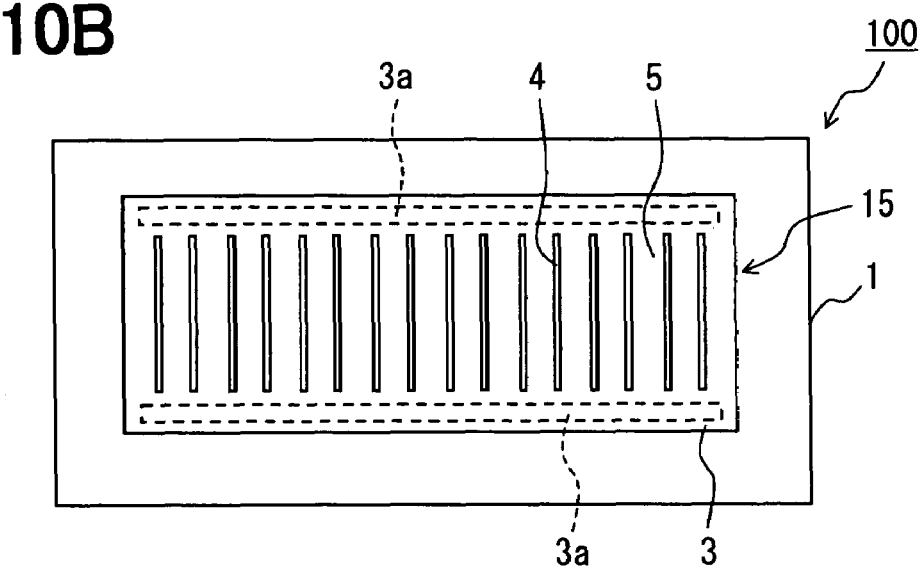
FIG. 10B is a plan view of the optical device of FIG. 10A.

In the present embodiment, the columnar members 5 and the gaps 4 are alternately arranged to construct the microlens 2. Alternatively, as shown in FIGS. 9A, 9B, the columnar members 5 and the gaps 4 may construct a microprism 14. Alternatively, as shown in FIGS. 10A, 10B, the columnar members 5 and the gaps 4 may construct an optical waveguide 15.

Second Embodiment

Figure 11A:
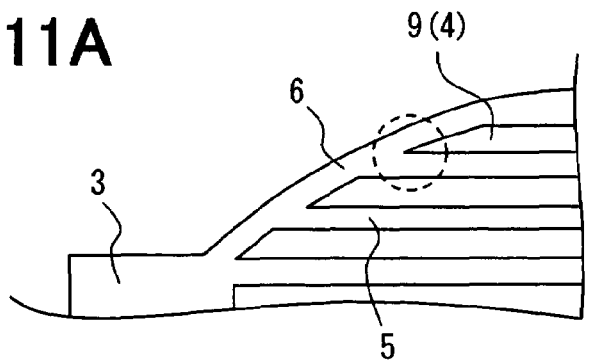
FIG. 11A is a partially enlarged view of FIG. 5A.
Figure 11B:
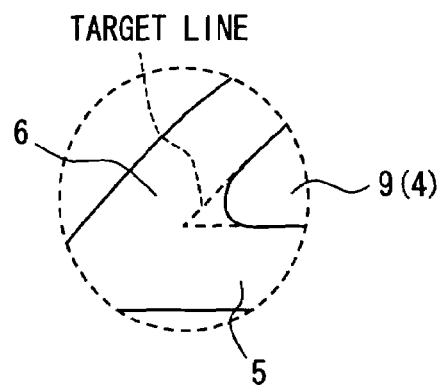
FIG. 11B is a partially enlarged view of FIG. 11A.

An optical device 200 according to a second embodiment of the present invention is described below with reference to FIGS. 11A-12. Differences between the optical devices 100, 200 are as follows:

In the first embodiment, the first reinforcing member 6 joins the columnar members 5 forming the convex portion of the microlens 2 together to define the convex outlet surface 2b. In such a structure, as shown in FIGS. 11A, 11B, it is difficult to accurately form the inner trench 9 along a target line (i.e., the mask 8). Specifically, since the columnar member 5 and the first reinforcing member 6 forms an acute angle, etching may be imperfectly performed at the acute angle portion. As a result, the acute angle portion is rounded so that the width W of the columnar member 5 is greater than a desired value. Therefore, unoxidized portion may remain even after the thermal oxidation. To prevent the unoxidized portion, it is required that the thermal oxidation time is increased.

Figure 12:
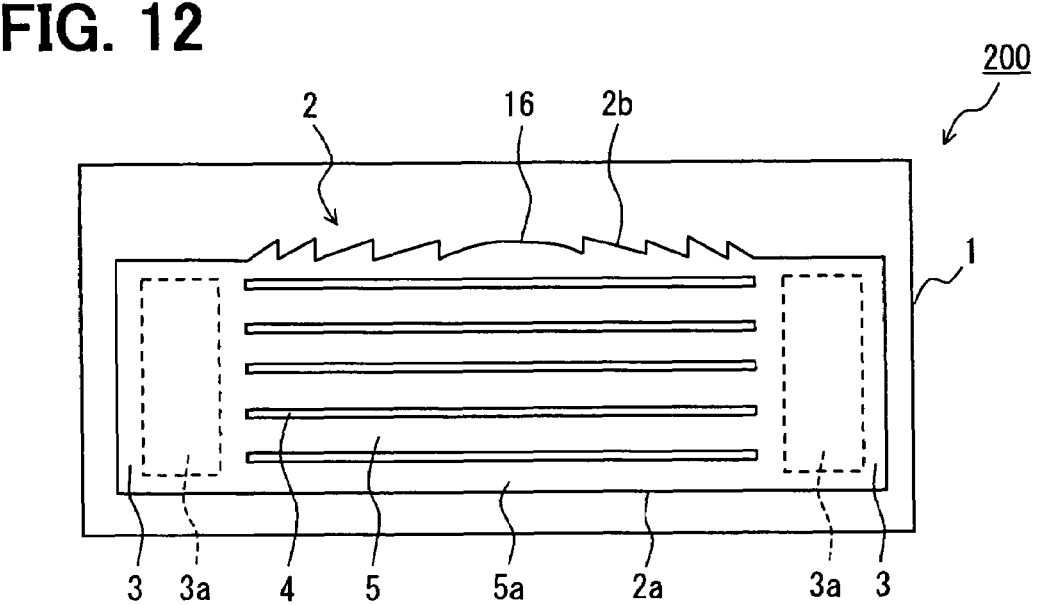
FIG. 12 is a plan view of an optical device according to a second embodiment of the present invention.
Figure 13:
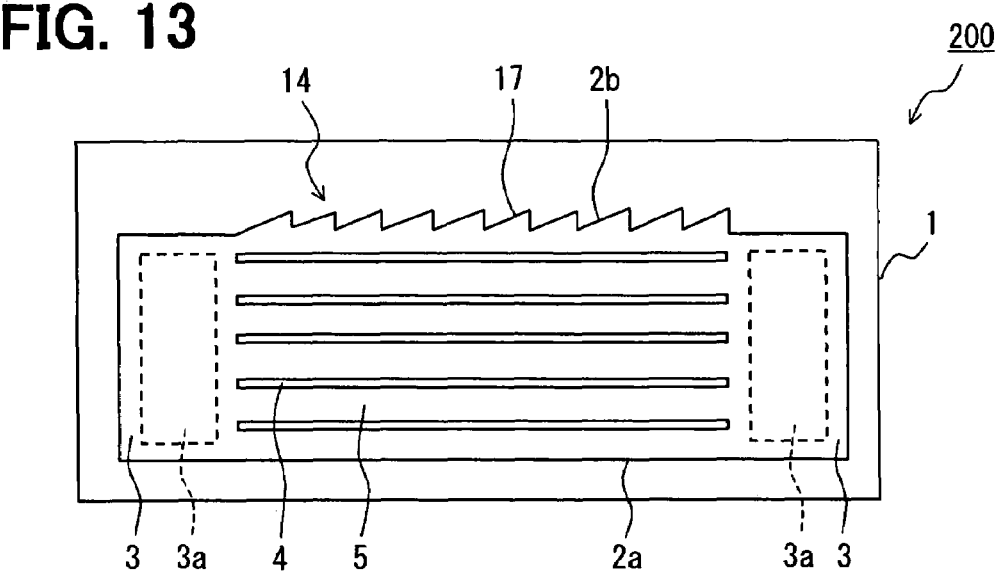
FIG. 13 is a plan view of an optical device according to a modification of the second embodiment.

In contrast, in the present embodiment, as shown in FIG. 12, a Fresnel lens 16 is formed to at least one of the inlet surface 2a and the outlet surface 2b of the microlens 2. In such an approach, the first reinforcing member 6 becomes unnecessary, and an acute portion does not exist. Therefore, etching can be perfectly performed so that the unoxidized portion can be prevented. Further, size of the optical device 200 in a surface direction of the silicon substrate 1 can be smaller than that of the optical device 100 by removing the first reinforcing member 6. The optical device 200 can be manufactured in a similar manner described in the first embodiment.

Although FIG. 12 shows the case where the Fresnel lens 16 is formed to only the outlet surface 2b, the Fresnel lens 16 may be formed to only the inlet surface 2b, or formed to each of the inlet and outlet surfaces 2a, 2b.

A thin lens other than the Fresnel lens 16 may be employed. For example, a diffractive lens or a blazed grating 17 may be employed instead of the Fresnel lens 16. Further, different lenses may be formed to the inlet and outlet surfaces 2a, 2b, respectively. The diffractive lens has a sawtooth pattern calculated based diffraction theory. The blazed grating 17 a sawtooth pattern calculated based diffraction theory and passes light only in one direction.

Figure 14A:
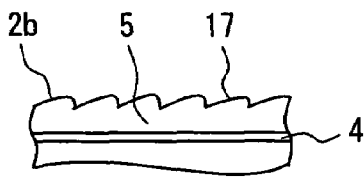
FIG. 14A is a partially enlarged view of FIG. 13, showing a light outlet surface portion close to a silicon substrate.
Figure 14B:
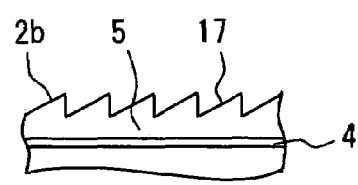
FIG. 14B is a partially enlarged view of FIG. 13, showing the light outlet surface portion away from the silicon substrate.

FIG. 14A shows the sawtooth pattern of the blazed grating 17 located away from the surface of the silicon substrate 1. FIG. 14B shows the sawtooth pattern of the blazed grating 17 located near the surface of the silicon substrate 1. As can be seen from comparing FIGS. 14A, 14B, when the blazed grating 17 is formed to at least one of the inlet and outlet surfaces 2a, 2b, sharpness of the sawtooth pattern of the blazed grating 17 increases with a distance from the surface of the silicon substrate 1. This may be caused by the fact that when the trenches 9, 10 are formed by reactive ion etching (RIE), path of ion beam in plasma is unstable due to asymmetry between the trenches 9, 10.

Figure 15:
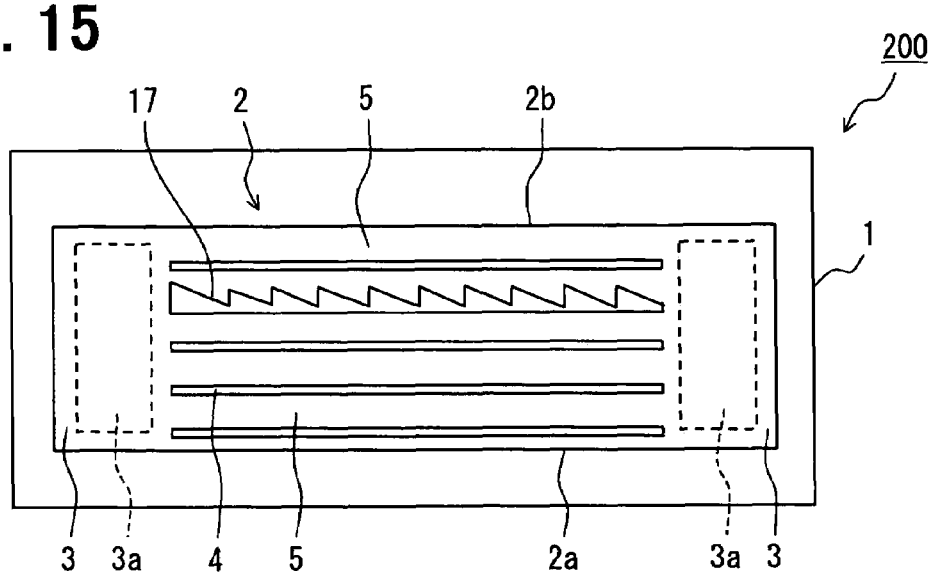
FIG. 15 is a plan view of an optical device according to another modification of the second embodiment.

Therefore, as shown in FIG. 15, the blazed grating 17 may be formed to surfaces other than the inlet and outlet surfaces 2a, 2b. In such an approach, the sharpness of the sawtooth pattern of the blazed grating 17 can be ensured regardless of the distance from the surface of the silicon substrate 1. In short, the sawtooth pattern of the blazed grating 17 become uniform in the vertical direction so that the transmittance of the light can be improved.

Third Embodiment

An optical device 300 according to a third embodiment of the present invention is described below with reference to FIGS. 16-17. Differences between the optical devices 100, 300 are as follows:

In the embodiments described above, the columnar members 5 are arranged in the arrangement direction, and the light propagates through the columnar members 5 in the arrangement direction. In contrast, in the third embodiment, the light propagates through the columnar members 5 in the length direction of the columnar members 5.

Figure 16:
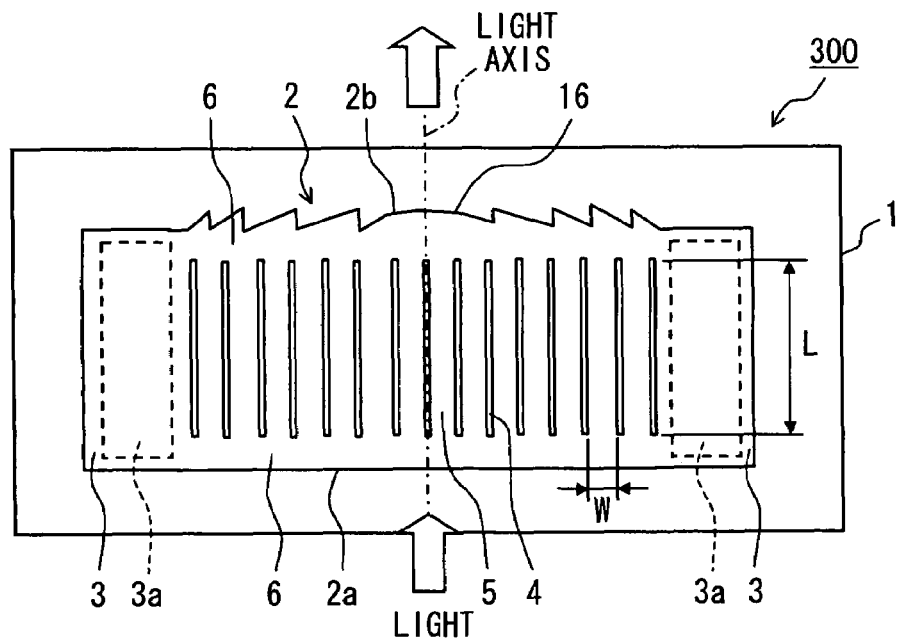
FIG. 16 is a plan view of an optical device according to a third embodiment of the present invention.
Figure 17:
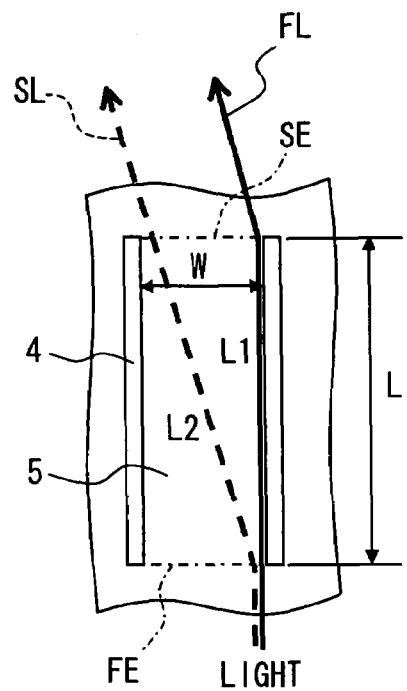
FIG. 17 is a partially enlarged view of FIG. 16.

As shown in FIG. 16, the optical device 300 includes a silicon substrate 1, a microlens 2 disposed on a top surface of the silicon substrate 1, and a second reinforcing member 3 integrally formed with both ends of the microlens 2.

The microlens 2 includes a plurality of columnar members 5 made of silicon oxide. The columnar members 5 are arranged in parallel with a gap 4 in an arrangement direction perpendicular to a length direction thereof. Preferably, the microlens 2 further includes a first reinforcing member 6 made of silicon oxide. The first reinforcing member 6 defines an outer shape of the microlens 2.

As shown in FIG. 16, each columnar member 5 has a length L in the length direction. Light of single wavelength propagates through the columnar members 5 in parallel with an optical axis of the microlens 2. The optical axis is represented by a dashed line. A width W of the columnar member 5 in the arrangement direction is set to satisfy the following equation:

$$L = \frac{N1\left\{W^2 - \left(\frac{\lambda}{2 \times N1}\right)^2\right\}}{\lambda} \quad (5)$$

In the equation (5), $\lambda$ represents the wavelength of the light, N1 represents a refractive index of silicon oxide forming the columnar members 5. When the light of single wavelength enters the microlens 2 in the length direction of the columnar member 5, an angle between the incident direction of the light and an interface between the columnar member 5 and the gap 4 is equal to or less than a critical angle (e.g., 43.6 degrees). As a result, the light is totally reflected at the interface ideally.

Therefore, it is considered that the microlens 2 is constructed with multiple optical waveguides. As shown in FIG. 17, when the light enters one columnar member 5 sandwiched between the gaps 4, diffraction (or scattering) of the light occurs at end portions of the columnar member 5 in the length direction. Since the columnar member 5 is a closed system, interference of the light occurs in the columnar member 5.

The equation (5) is determined as follows: The length L and width W of the columnar member 5 are set so that a first diffraction light FL occurring at a first end portion FE (inlet surface 2a side) of the columnar member 5 cancels a second diffraction light SL occurring at a second end portion SE (outlet surface 2b side) of the columnar member 5. As indicated by a solid line in FIG. 17, the first diffraction light FL is not diffracted at the first end portion FE and is diffracted at the second end portion SE. In contrast, as indicated by a broken line in FIG. 17, the second diffraction light FL is diffracted at the first end portion FE and is not diffracted at the second end portion SE. When the following equation is satisfied, the first and second diffraction light FL, SL cancel each other.

$$L2 - L1 = \frac{\lambda}{2 \times N1} \quad (6)$$

In the equation (6), L1 represents an optical path difference of the first diffraction light FL between the first and second end portions FE, SE. L2 represents an optical path difference of the second diffraction light SL between the first and second end portions FE, SE. L2 is given by the following equation:

$$L2 = (L2 + W^2)^{1/2} \quad (7)$$

The equation (5) is obtained by substituting the equation (7) into the equation (6). A result of a simulation conducted by the present inventor shows that the first and second diffraction light FL, SL cancel each other when the length L and width W of the columnar member 5 are set to satisfy the equation (5).

In the present embodiment, as shown in FIG. 16, the end portions of the columnar members 5 in the length direction are joined together by the first reinforcing member 6 to define the shape of the inlet and outlet surfaces 2a, 2b of the microlens 2. the microlens 2 is a flat type cylindrical convex lens (i.e., cylindrical plano-convex lens). The inlet surface 2a is a flat surface, and the outlet surface 2b is provided with a Fresnel lens 16. In such an approach, the mechanical strength of the columnar members 5 is improved by the first reinforcing member 6, and the optical device 300 is made compact in a surface direction of the silicon substrate 1.

The second reinforcing member 3 has a columnar shape and stands on the top surface of the silicon substrate 1. The second reinforcing member 3 is provided to end portion of the columnar members 5 in the arrangement direction and is joined to at least one of the columnar member 5 and the first reinforcing member 6.

A first width of the second reinforcing member 3 in the arrangement direction is greater than the width W of the columnar member 5. Further, a second width of the second reinforcing member 3 in the length direction is greater than the width W of the columnar member 5. Although the second reinforcing member 3 is made of silicon oxide, the second reinforcing member 3 has the unoxidized portion 3a. The second reinforcing member 3 are joined to the columnar members 5 so that mechanical strength of the microlens 2 can be improved. Since the unoxidized portion 3a is placed outside the end portions of the columnar members 5, the light cannot be obstructed by the unoxidized portion 3a. The microlens 2 is constructed with oxidized portions of the columnar members 5, the first reinforcing member 6, and the second reinforcing member 3. The optical device 300 can be manufactured in a similar manner described in the first embodiment.

As described above, according to the third embodiment, the diffractive effect can be prevented in the case where the light passes through the columnar members 5 in the length direction of the columnar members 5. Therefore, although the microlens 2 has the gaps 4, the high transmittance of the light can be obtained.

It is preferable that the length L and the width W of the columnar member 5 are set to satisfy the following equation:

$$L = \frac{N1\left\{(W + \delta W)^2 - \left(\frac{\lambda}{2 \times N1}\right)^2\right\}}{\lambda} \quad (8)$$

In the equation (8), δW represents a correction value of the width W. The correction value δW is given by the following equation:

$$\delta W = -1.05\lambda^2 + 3.104\lambda - 1.707 \quad (9)$$

When the length L and the width W of the columnar member 5 are set to satisfy the equation (5), the diffractive effect may slightly occur. The slight diffractive effect may be caused by the fact that the width W of the columnar member 5 is a few times the wavelength λ of the light. Specifically, because the width W of the columnar member 5 is only a few times the wavelength λ of the light, the light may penetrate toward the gap 4 at the interface between the columnar member 5 and the gap 4. To correct the dependence of the width W on the wavelength λ, the correct value δW is calculated based on a result of simulation conducted by the inventor. According to the simulation result, when the length L and the width W of the columnar member 5 are set to satisfy the equations (8), (9), the diffractive effect is efficiently prevented so that the light transmittance can exceed 90%.

An example of a method of forming the columnar members 5 satisfying the equations (8), (9) is described below. When the wavelength λ of the light is 0.88 μm, and the refractive index N1 of the columnar member 5 (i.e., silicon substrate) versus the wavelength λ is 1.445, the trench etching is performed so that the width W is 1.7 μm, and the width of the inner trench 9 between adjacent columnar members 5 is 2.3 μm.

After the thermal oxidation, the width W of the columnar member 5 increases to 3.77 μm, and the width of the inner trench 9 decreases to 0.23 μm accordingly. In this case, the length L of the columnar member 5 is calculated as 25.87 μm from the equations (8), (9). Therefore, the trench etching is performed so that the length L of the columnar member 5 is an integral multiple of 25.87 μm. For example, when the trench etching is performed so that the length L of the columnar member 5 is 25.87 μm, the length L of the columnar member 5 increases to about 28 μm after the thermal oxidation.

The third embodiment described above may be modified in various ways. For example, the gap 4 may be filled with material other than air. It is preferable that a difference between refractive indexes of the material and silicon oxide (i.e., the columnar members 5) is less that a difference between refractive indexes of air and silicon oxide. In such an approach, even when the light propagates through the columnar members 5 in a slanting direction with respect to the arrangement direction, reduction in the light transmittance due to scattering of the light can be limited.

The Fresnel lens 16 may be replaced with the diffractive lens, the blazed grating 17, or the like. Alternatively, the columnar members 5 may be constructed as the microlens 2, the microprism 14, the optical waveguide 15, or the like. At least one of the first reinforcing member 6 and the second reinforcing member 3 may be optional.

Such changes and modifications are to be understood as being within the scope of the present invention as defined by the appended claims.

What is claimed is:

1. An optical device comprising:
   a silicon substrate; and
   a plurality of columnar members integrally formed with the silicon substrate and standing on a top surface of the silicon substrate, the plurality of columnar members being made of silicon oxide,
   wherein light enters the plurality of columnar members in a first direction and propagates through the plurality of columnar members in a second direction,
   wherein the plurality of columnar members extend in a third direction,
   wherein an angle between the first and third directions is greater than a critical angle and equal to or less than 90 degrees,
   wherein the plurality of columnar members are arranged with a gap in the second direction, and
   wherein the second direction is perpendicular to the third direction.

2. The optical device according to claim 1,
   wherein the light has a wavelength λ,
   wherein the silicon oxide has a first refractive index N1 versus the wavelength λ,
   wherein the gap is filled with a material having a second refractive index N2 versus the wavelength λ, the second refractive index N2 being less than the first refractive index N1,
   wherein each columnar member has a width W in the second direction,
   wherein the gap has a width T in the second direction, $$\text{wherein } W = \frac{A}{4 \times N1}\lambda,$$

wherein A is a positive odd number, $$\text{wherein } T = \frac{B}{2 \times N2}\lambda, \text{ and}$$

wherein B is a positive integer.

3. The optical device according to claim 2,
   wherein the material is air.

4. The optical device according to claim 1, further comprising:
   a first reinforcing member integrally formed with the silicon substrate and standing on the top surface of the silicon substrate, the first reinforcing member being made of silicon oxide,
   wherein the first reinforcing member joins adjacent columnar members together.

5. The optical device according to claim 4,
   wherein the first reinforcing member joins middle portions of adjacent columnar members together.

6. The optical device according to claim 4,
   wherein the first reinforcing member joins end portions of adjacent columnar members together.

7. The optical device according to claim 6,
   wherein the light enters and/or exits the plurality of the columnar members through the first reinforcing member.

8. The optical device according to claim 1,
   wherein at least one of the plurality of the columnar members has a Fresnel lens, a diffractive lens, or a blazed grating on a front surface directed toward the second direction.

9. The optical device according to claim 8,
   wherein the light enters and/or exits the plurality of columnar members through the front surface.

10. The optical device according to claim 8,
    wherein the front surface of at least one of the plurality of the columnar members faces a back surface of an adjacent columnar member.

11. The optical device according to claim 1, further comprising:
- a second reinforcing member integrally formed with the silicon substrate and standing on the top surface of the silicon substrate, the second reinforcing member being made of silicon oxide,
- wherein the second reinforcing member has a first width in the second direction and a second width in the third direction,
- wherein each of the first and second widths is less than the width W of each columnar member, and
- wherein the second reinforcing member is placed on at least one end side of the plurality of the columnar members in the third direction to join end portions of the plurality of the columnar members together.

12. The optical device according to claim 1,
- wherein the silicon substrate includes a base portion shaped corresponding to the plurality of columnar members in a direction perpendicular to the top surface of the silicon substrate, and
- wherein the silicon substrate and the plurality of columnar members are joined together through the base portion.

13. An optical device comprising:
- a silicon substrate; and
- a plurality of columnar members integrally formed with the silicon substrate and standing on a top surface of the silicon substrate, the plurality of columnar members being made of silicon oxide,
- wherein light propagates through the plurality of columnar members in a first direction,
- wherein the plurality of columnar members extend in the first direction,
- wherein the plurality of columnar members are arranged with a gap in a second direction perpendicular to the first direction,
- wherein the light has a wavelength $\lambda$,
- wherein the silicon oxide has a refractive index N,
- wherein each columnar member has a width W in the second direction,
- wherein each columnar member has a length L in the first direction, and $$\text{wherein } L = \frac{N\left\{W^2 - \left(\frac{\lambda}{2 \times N}\right)^2\right\}}{\lambda}.$$

14. The optical device according to claim 13,
wherein the gap is filled with air.

15. The optical device according to claim 13,
- wherein the gap is filled with a material,
- wherein a difference between refractive indexes of silicon oxide and the material is a first value,
- wherein a difference between refractive indexes of silicon oxide and air is a second value, and
- wherein the first value is less than the second value.

16. The optical device according to claim 13, further comprising:
- a first reinforcing member integrally formed with the silicon substrate and standing on the top surface of the silicon substrate, the first reinforcing member being made of silicon oxide,
- wherein the first reinforcing member joins end portions of the plurality of columnar members together at least on one side in the first direction.

17. The optical device according to claim 16,
wherein the first reinforcing member is a Fresnel lens, a diffractive lens, or a blazed grating.

18. The optical device according to claim 16, further comprising:
- a second reinforcing member integrally formed with the silicon substrate and standing on the top surface of the silicon substrate, the second reinforcing member being made of silicon oxide,
- wherein the second reinforcing member has a first width in the first direction and a second width in the second direction,
- wherein each of the first and second widths is less than the width W of each columnar member, and
- wherein the second reinforcing member is placed on at least one end side of the plurality of the columnar members in the second direction and is joined to at least one of the first reinforcing member and one of the plurality of the columnar members, the one of the plurality of the columnar members being located at the one end side.

19. An optical device comprising:
- a silicon substrate; and
- a plurality of columnar members integrally formed with the silicon substrate and standing on a top surface of the silicon substrate, the plurality of columnar members being made of silicon oxide,
- wherein light propagates through the plurality of columnar members in a first direction,
- wherein the plurality of columnar members extend in the first direction,
- wherein the plurality of columnar members are arranged with a gap in a second direction perpendicular to the first direction,
- wherein the light has a wavelength $\lambda$,
- wherein the silicon oxide has a refractive index N,
- wherein each columnar member has a width W in the second direction,
- wherein each columnar member has a length L in the first direction,
- wherein a correction value of the width W is $\delta W$, $$\text{wherein } L = \frac{N\left\{(W + \delta W)^2 - \left(\frac{\lambda}{2 \times N}\right)^2\right\}}{\lambda}, \text{ and}$$

wherein $\delta W = -1.05\lambda^2 + 3.104\lambda - 1.707$.

* * * * *